(12) United States Patent
Kim et al.

(10) Patent No.: US 12,092,456 B2
(45) Date of Patent: Sep. 17, 2024

(54) PRE-CONDITIONING INTERFEROMETER

(71) Applicant: Arizona Board of Regents on Behalf of the University of Arizona, Tucson, AZ (US)

(72) Inventors: Dae Wook Kim, Tucson, AZ (US); Heejoo Choi, Tucson, AZ (US); Trenton Brendel, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 304 days.

(21) Appl. No.: 17/596,439

(22) PCT Filed: Jun. 18, 2020

(86) PCT No.: PCT/US2020/038422
§ 371 (c)(1),
(2) Date: Dec. 10, 2021

(87) PCT Pub. No.: WO2020/257450
PCT Pub. Date: Dec. 24, 2020

(65) Prior Publication Data
US 2022/0299310 A1 Sep. 22, 2022

Related U.S. Application Data

(60) Provisional application No. 62/863,449, filed on Jun. 19, 2019.

(51) Int. Cl.
*H04B 10/08* (2006.01)
*G01B 9/02* (2022.01)
*G01M 11/02* (2006.01)

(52) U.S. Cl.
CPC ..... *G01B 9/02039* (2013.01); *G01M 11/0271* (2013.01)

(58) Field of Classification Search
CPC .............. H04B 10/516; H04B 10/2507; H04B 10/548; H04B 10/0795; H04B 10/07955; G01B 9/02039; G01M 11/0271
(Continued)

(56) References Cited

U.S. PATENT DOCUMENTS

| 5,739,906 A * | 4/1998 | Evans ................... G01B 11/06 356/503 |
| 5,883,717 A * | 3/1999 | DiMarzio ................ G01J 9/02 356/491 |

(Continued)

OTHER PUBLICATIONS

De Groot, Peter, "Phase Shifting Interferometry," Zygo Corporation, Optical Measurement of Surface Topography, 7 pages, 2009.
(Continued)

*Primary Examiner* — Hanh Phan
(74) *Attorney, Agent, or Firm* — Perkins Coie LLP

(57) ABSTRACT

Methods, apparatus and systems for testing an optical element are described. One example device for measuring a test optical component includes a pre-conditioning optical module positioned to receive an optical beam from a light source and to produce a beam having a non-collimated beam profile or a freeform wavefront. The device further includes a beam splitter positioned to receive the beam output from the pre-conditioning optical module and to direct a first portion of the beam to a reference arm configured to accommodate a reference optical component, and to direct a second portion of the beam to a test arm configured to accommodate the test optical component. The device also includes a beam combiner positioned to receive the beams from the reference arm and the test arm after reflection or refraction by the reference and the test optical components.

21 Claims, 7 Drawing Sheets

(58) Field of Classification Search
USPC ....... 398/192, 193, 194, 195, 183, 188, 202, 398/208, 209, 33, 38, 118, 119, 25, 16; 356/512, 450, 497, 73.1
See application file for complete search history.

(56) References Cited

U.S. PATENT DOCUMENTS

| | | | | |
|---|---|---|---|---|
| 5,907,404 | A * | 5/1999 | Marron | G01J 9/02 |
| | | | | 356/489 |
| 7,298,497 | B2 * | 11/2007 | Millerd | G01N 21/45 |
| | | | | 356/512 |
| 2013/0208284 | A1 * | 8/2013 | Pouet | G01H 9/008 |
| | | | | 356/502 |
| 2016/0054195 | A1 | 2/2016 | Greivenkamp et al. | |
| 2018/0003484 | A1 | 1/2018 | Goodwin | |
| 2018/0106591 | A1 | 4/2018 | Hetzler et al. | |
| 2018/0328711 | A1 | 11/2018 | Baer et al. | |

OTHER PUBLICATIONS

Huang, Lei, et al., "Adaptive interferometric null testing for unknown freeform optics metrology," Optics Letters, vol. 41, No. 23, pp. 5539-5542, 2016.
International Search Report and Written Opinion mailed Sep. 24, 2020 for International Patent Application No. PCT/US2020/038422 (8 pages).
Kim, Dae Wook, et al., "Pseudo-Nulling Mach-Zehnder Interferometer," University of Arizona, College of Optical Sciences, 6 pages, 2019.

\* cited by examiner

PRE-CONDITIONING INTERFEROMETER

CROSS REFERENCE TO RELATED APPLICATIONS

This patent documents is a 371 National Phase Application of International Patent Application No. PCT/US2020/038422, filed Jun. 18, 2020, which claims priority to the provisional application with Ser. No. 62/863,449, titled "Pre-Conditioning Interferometer," filed Jun. 19, 2019. The entire contents of the above noted application are incorporated by reference as part of the disclosure of this document.

BACKGROUND

Freeform optics are becoming increasingly common in modern optical designs as fabrication technologies improve to meet the demands of optical designers and their customers. Despite rapid developments in the fabrication of such complex optical surfaces, the metrology techniques for testing these surfaces have not been adequately developed. For example, molded cellphone camera lenses, now made with freeform surfaces to correct for a variety of aberrations and package size restrictions, are not easy to be measured using conventional test instrument.

SUMMARY

The disclosed methods, apparatus and systems relate to low cost and low complexity testing of freeform optical components that can be used to measure freeform and irregular-shaped surfaces. The disclosed embodiments are enabled at least in-part by pre-conditioning the light that is introduced to an interferometer so that beams from highly curved or freeform optical surfaces can interfered to form fringes, thus enabling efficient testing of freeform surfaces.

One example an apparatus for measuring a test optical component includes a pre-conditioning optical module positioned to receive an optical beam from a light source and to produce a beam having a non-collimated beam profile or a freeform wavefront. The apparatus also includes a beam splitter positioned to receive the beam output from the pre-conditioning optical module and to direct a first portion of the beam to a reference arm configured to accommodate a reference optical component, and to direct a second portion of the beam to a test arm configured to accommodate the test optical component. The apparatus further includes a beam combiner positioned to receive the beams from the reference arm and the test arm after reflection or refraction by the reference and the test optical components. The pre-conditioning optical module is configured to introduce a change in a profile or a wavefront of the beam that is output from the pre-conditioning optical module such that the beams that are output from the beam combiner form a resolvable fringe pattern at a detector image plane.

DETAILED DESCRIPTION

Figure 1:
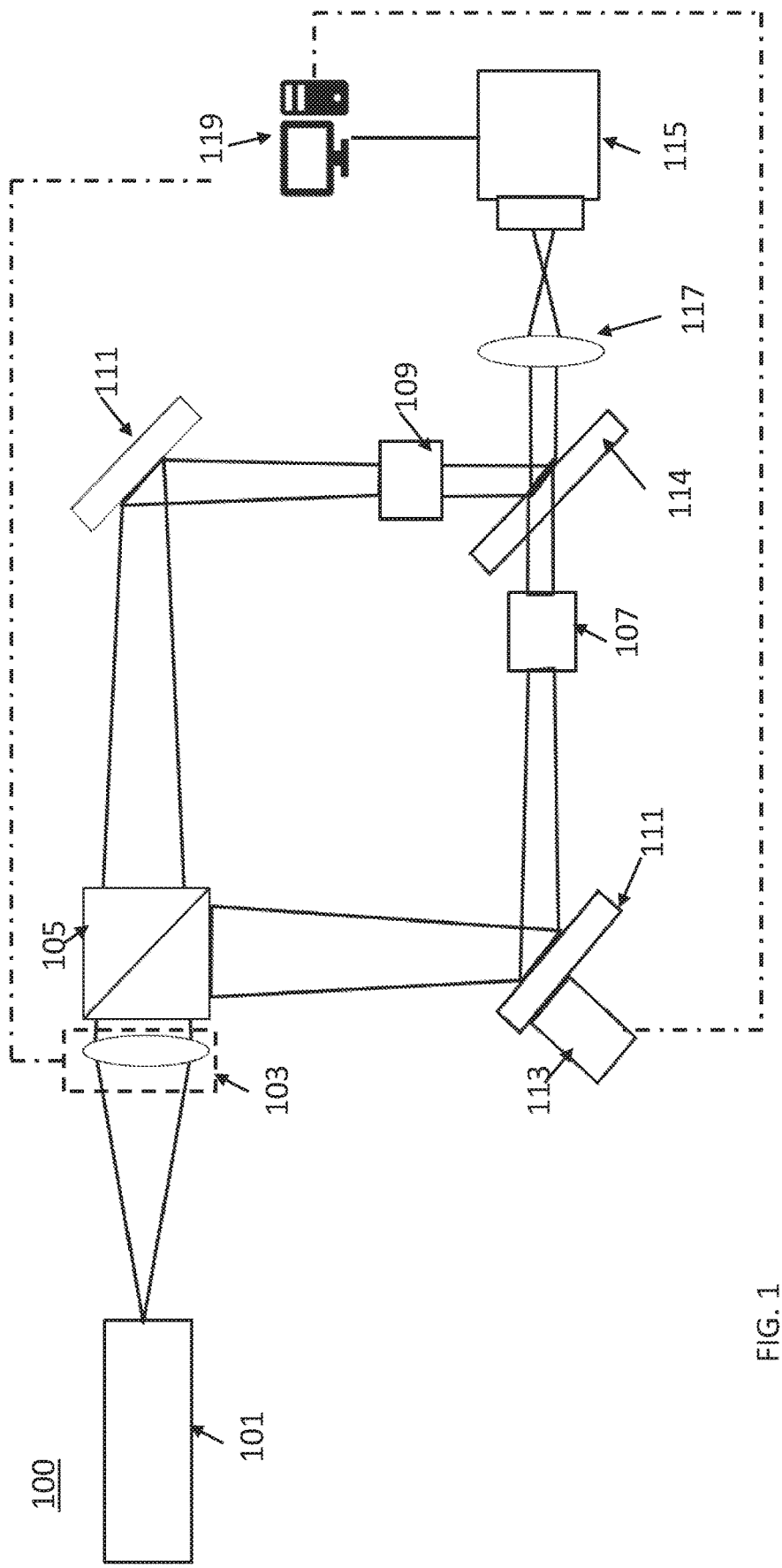
FIG. 1 illustrates an example Mach-Zehnder interferometer configuration with a pre-conditioning optical module in accordance with the present technology.

Freeform optical components are used in many applications and optical technologies, ranging from astronomical equipment, to unmanned aerial vehicles (UAV), to autonomous vehicles and many more. Mass produced freeform optical components have proliferated with improvements in modern cellphone cameras accompanied by advancements in image processing, sensors, and optical manufacturing. The use of freeform, molded plastic or glass lenses allows these cameras to provide users with the ability to capture high quality images. Such lenses are produced in large quantities and with a wide variety of surface shapes to minimize aberrations while still maintaining a small form factor and light weight. One of the difficulties in fabricating freeform lenses, however, is testing the surfaces to verify that the correct shape has been achieved using interferometric techniques.

Interferometry is a family of techniques in which waves are superimposed to cause interference to extract information about the surface surfaces that are being tested. Interferometry methods can be used to test complex freeform lenses. However, high optical power of the test surfaces and the unique shapes of those surfaces limit the ability of interferometric techniques because of the limited dynamic range of the instruments used. For example, the phase-shifting interferometry is a testing technique that uses a piezoelectric inertia actuator or wavelength tuning for testing of standard optical surfaces. When testing freeform optics, phase-shifting interferometry requires null optics to produce a reference wavefront that is nearly identical to the wavefront generated by interaction with the sample under test to minimize retrace error and obtain interference fringes. Using nulling optics, the test measures differences between the reference optics (null optics) and the target sample. However, freeform lenses often have unusual surface shapes to accomplish design goals, and it is difficult to fabricate null optics to compensate all the unique freeform shapes and the highly aberrated wavefronts they yield.

Furthermore, freeform optical components often include highly curved surface shapes, causing the beams to reflect from or refract through an optical surface at such large angles that they fail to re-enter the interferometer and produce interference fringes at the point of fringe localization. As such, a re-trace error occurs with no observable fringes, making conformance testing often impossible, or at best expensive and time consuming.

This patent document describes techniques that can be implemented in various embodiments, that among other features and benefits, pre-condition the light that is introduced to an interferometer so that beams from highly curved or freeform optical surfaces can form fringes, thereby enabling efficient testing of freeform surfaces. The disclosed embodiments are particularly suitable in applications where large quantity of freeform optical components are tested (e.g., as part of conformance testing), but are also generally applicable to any application that can benefit from low cost and low complexity testing of freeform optical components. The disclosed pre-conditioning techniques can be adapted to account for different detection ranges and the lens sizes, and thus are highly flexible for various interferometer configurations.

FIG. 1 illustrates an example Mach-Zehnder interferometer configuration 100 with a pre-conditioning optical module in accordance with the present technology. By the way of example, and not by limitation, FIG. 1 is described in the context of testing a freeform lens (e.g., a lens in a mobile device) but it is understood that the configuration of FIG. 1 can be used with other freeform optical components. In FIG. 1, a light source 101 is configured to emit an input beam (e.g., a laser). A pre-conditioning optical module 103 is positioned to receive the light beam and pass the light beam to a beam splitter 105 (e.g., a cube beam splitter, a pellicle, or another optical component). The beam splitter 105 splits the incoming beam into two arms: one arm is for directing the beam towards a reference optics 107, and the other is for directing the beam towards a target optics 109 (also referred to as the unit under test (UUT)). Both the reference optics 107 and the target optics 109 can include one or more optical components (e.g., multiple freeform lenses). In both arms, mirrors 111 can be positioned to redirect the beams in the test and reference arms. The beams are combined by the beam combiner 114 to form interference fringes. In some embodiments, a component similar to the beam splitter 105 can be used (in reverse) to operate as the beam combiner 114.

The pre-conditioning optical module 103 can include one or more optical elements, including but not limited to, a soft lens, a liquid lens, a spatial light modulator (SLM), a reflective object, one or more prisms, a zoom lens, an Alvarez lens, or any combinations thereof. In addition, in some embodiments, the pre-conditioning module may include additional components such as neutral density filters, spectral filters, polarization filters, or other components to, to enable adjustments to the intensity and/or spectral content, or polarization of the light beam. Without the pre-conditioning optical module 103, the beams can become too diverging or converging after going through the reference and/or the target optics (e.g., by refraction and/or reflection) that no fringes are formed at the point of fringe localization. The pre-conditioning optical module 103 is configured to shape the beams that are incident on the two lenses (the reference and target optics) such that the outgoing beams have a different profile going through the lenses at, for example, a much smaller angle to produce interference fringes at the detector 115. For example, in some embodiments, the beams that reach the reference and test surfaces are converging beams within a set of angles that allow fringes to be formed at the detector plane. As shown in FIG. 1, an imaging lens 117 produces images at the detector 115. The detector 115 is in communication with a control and processing unit 119 to process the imaged fringes. Through the use of a phase-reconstruction algorithm, a surface map of the difference in the wavefront produced by UUT 107 and the reference 109 can be obtained by the control and processing unit 119. The final result of this process can be a wavefront map showing the relative deviation of the wavefronts produced by the two lenses. The control and processing unit 119 can further determine the result of the conformance testing based on the wavefront map. By the way of example and not by limitation, the control and processing unit 119 can be a computer device (e.g., a desktop, a laptop), can be a mobile device, can be coupled to the detector 115 via wired or wireless communication links, can be part of a cloud computing platform, can be implemented using electronic circuits that are integrated as part of the detector 115, or combinations thereof.

Figure 2:
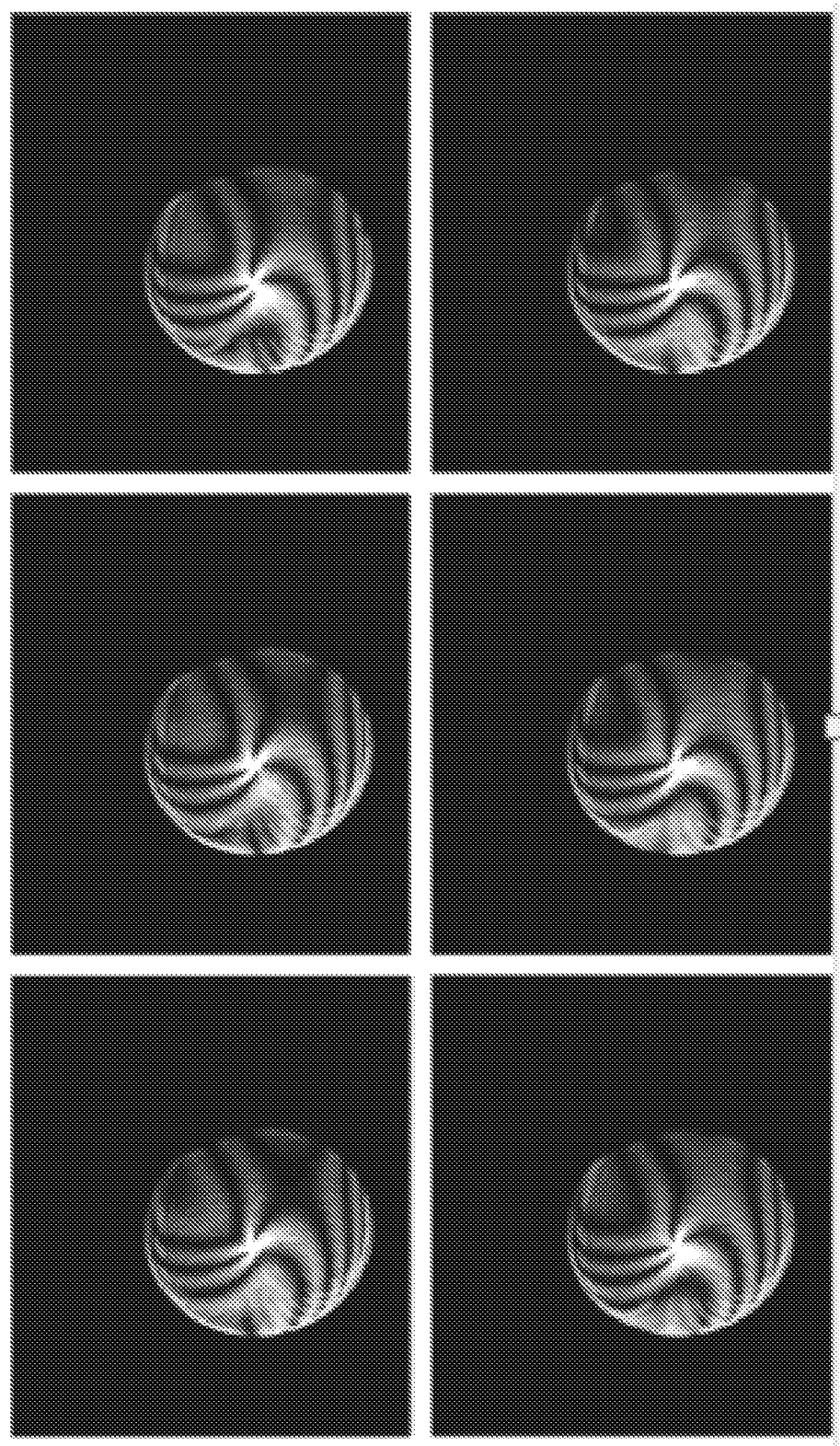
FIG. 2 illustrates an example of phase-shifted interference fringe images produced in accordance with the present technology.

One of the downsides of using a converging wavefront before amplitude division that occurs at a cube beam splitter 105 is that both exiting wavefronts pick up spherical aberration, astigmatism, and coma in transmission through or reflection within the beam splitter. In some embodiments, a piezoelectric inertia actuator 113 is used to shift one of the mirrors 111 in the interferometer configuration 100, changing the optical path length of the corresponding path and introducing an optical path difference between the two paths. The step size of phase-shifting can be determined by the step size of the piezoelectric inertia actuator 113. For example, the step size can be $\lambda/4$ (where $\lambda$ is the wavelength of incident light), or $\pi/2$ radians of phase. The induced optical path difference (e.g., by the piezoelectric inertia actuator 113) can appear as a shift in the fringes across the detector plane. FIG. 2 illustrates an example of phase-shifted interference fringe images collected by the detector in accordance with an example embodiment. Each image in FIG. 2 corresponds to a particular phase shift. In some embodiments, the control and processing module 119 can be used to control one or both of the pre-conditioning optical module 103 and the piezoelectric inertia actuator 113. In some embodiments, the pre-conditioning optical module 103 includes an active optical component that can change the beam profile in response to an electrical or acoustic signal from the processing control module 119.

In some embodiments, the wavefront errors inherent to the test setup can be calibrated out by testing the setup with no test or reference optics inserted in either arm. After the calibration, a null fringe (completely bright or dark image) can be expected if the UUT and the reference optics are made from exactly the same process (that is, they are identical). However, in most practical testing scenarios, the surface shapes of the two lenses may have some small deviations. The wavefront map produced by the testing process can be used to evaluate if the deviations are within a conforming range, thereby determining whether the UUT meets the manufacturing standard.

Figure 3:
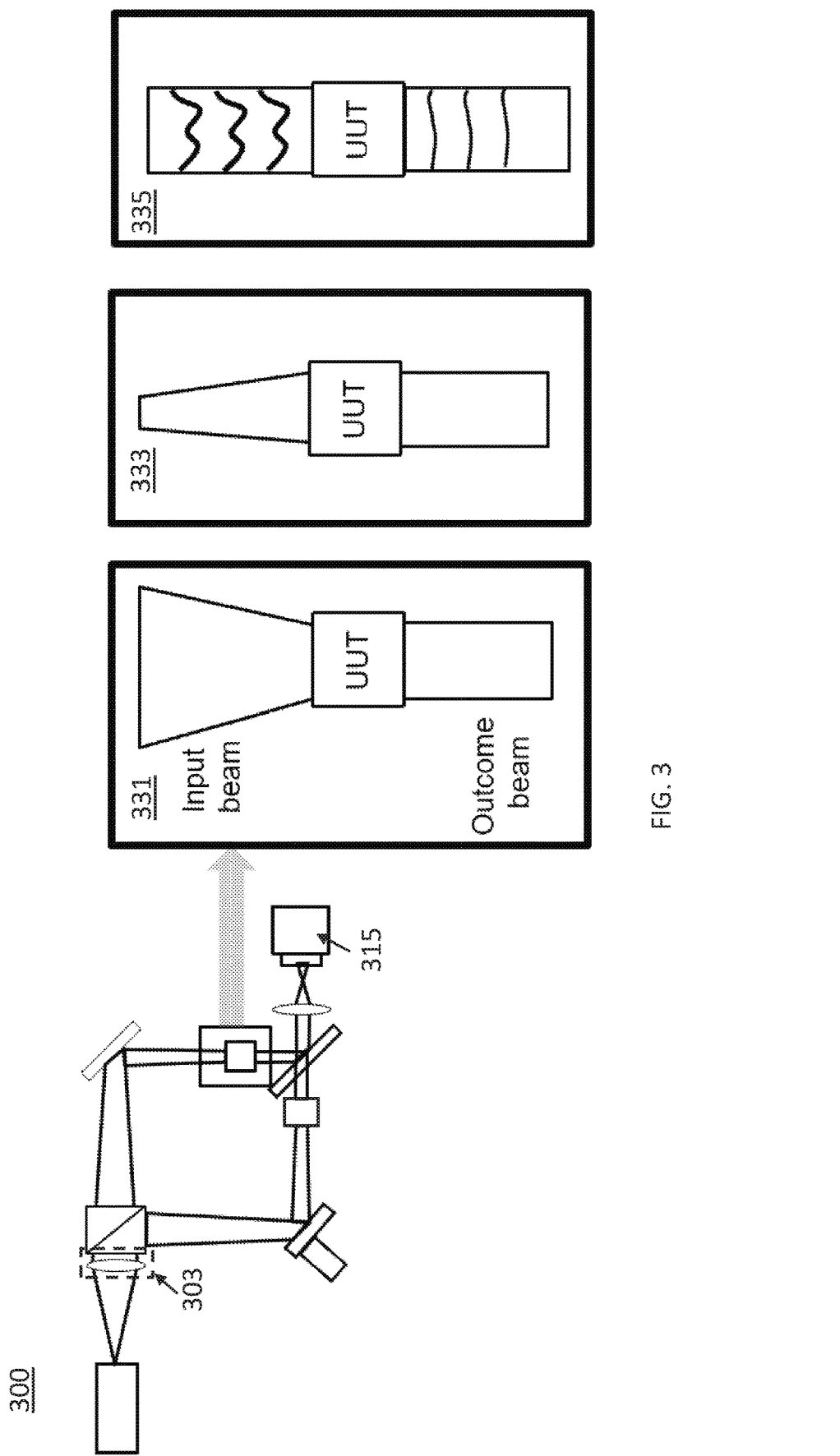
FIG. 3 illustrates example incoming beams and outgoing beams that go through the unit under test in an example Mach-Zehnder interferometer configuration in accordance with the present technology.

FIG. 3 illustrates examples of incoming beams and outgoing beams that go through the UUT in an example Mach-Zehnder interferometer configuration in accordance with the present technology. The left side of FIG. 3 illustrates an example Mach-Zehnder interferometer configuration 300 similar to what is depicted in FIG. 1. The input beam received by the UUT can have a converging profile (331), a diverging profile (333), or a freeform wavefront (335). The beams having a freeform wavefront that are reflected from or refracted through the optical component may still have some freeform wavefront residual but are now within a dynamic range of resolvable fringe generation at the detector plane 315. Because the beams have been pre-conditioned by the pre-conditioning optical module 303, the angle at which the output beams go through the UUT (e.g., by refraction and/or reflection) is within a range of angles to form fringes at the detector 315. The range of angles that would allow the formation of interference fringes depends on the profile of the beam that is incident of the two lenses (or more generally the reference and the test optical components), the surface shape of the UUT and the dimensions of the interferometer and its components. In some embodiments, the pre-conditioning optical components can be used to adjust the profile of the beam that is incident on the lenses to produce the fringes. In some embodiments, where a large number of similar components are to be tested, the incident light beam can be conditioned once to allow testing of a large number of components with similar surfaces that fall within a range of tolerance values.

Figure 4:
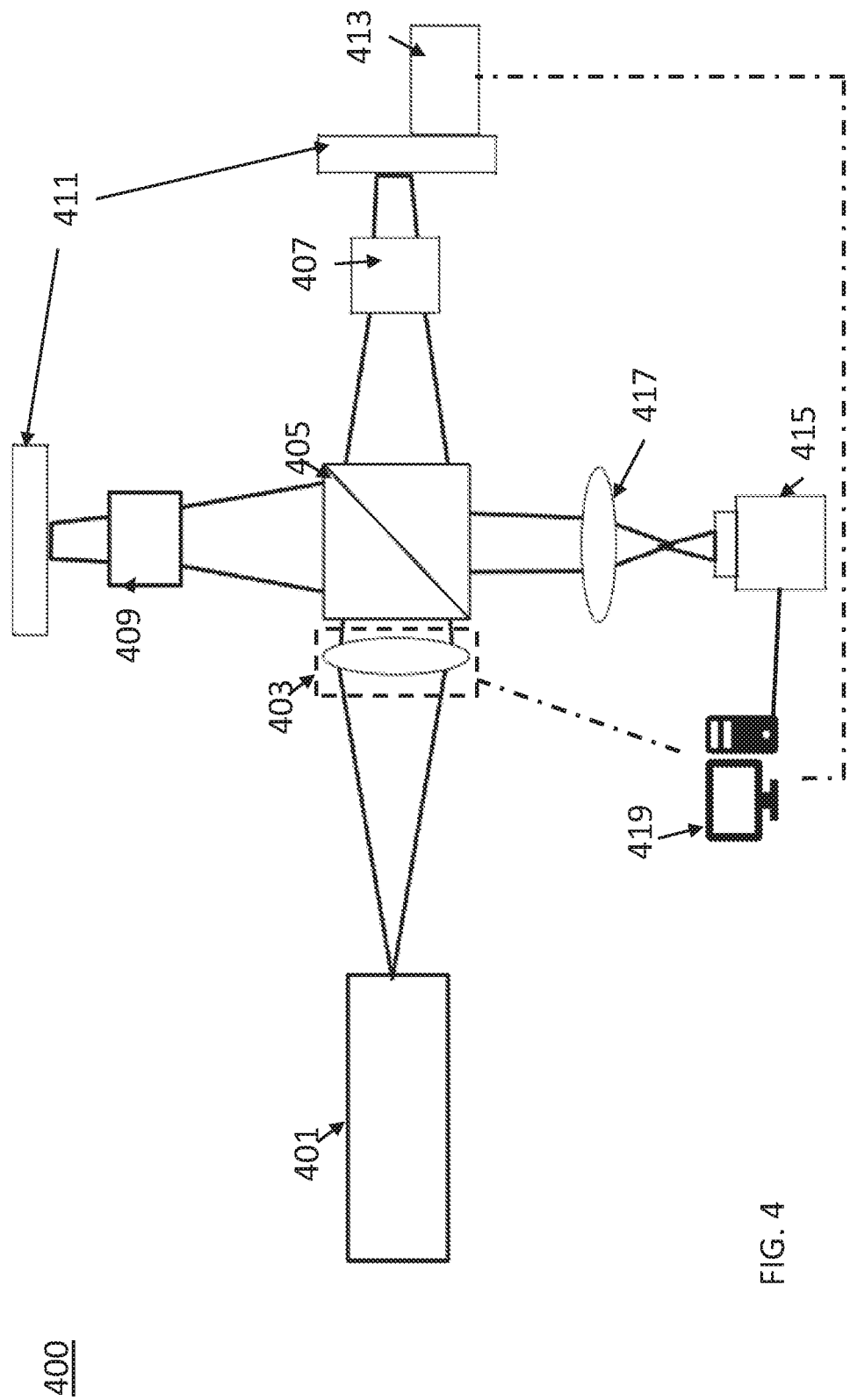
FIG. 4 illustrates an example Twyman-Green interferometer configuration with a pre-conditioning optical module in accordance with the present technology.

FIG. 4 illustrates an example Twyman-Green interferometer configuration 400 with a pre-conditioning optical module in accordance with the present technology. In this configuration 400, a light source 401 is configured to emit an input beam (e.g., a laser). A pre-conditioning optical module 403 is positioned to receive the light beam and pass the light beam to a beam splitter 405. In some embodiments, the beam splitter 405 also functions as a beam combiner to receive beams from the reference arm and the test arm after going through the reference and/or test lenses. In some embodiments, a separate beam combiner can be used to receive the beams.

Two mirrors 411 can be flat, concave, or convex, and positioned to direct the split beams towards the reference optics 407 and the UUT lens 409. Similar to the configuration shown in FIG. 1, in some embodiments, a piezoelectric inertia actuator 413 can be used to shift one of the mirrors 411 in the interferometer configuration 400, changing the optical path length of the corresponding path and introducing an optical path difference between the two paths. At the detector 415, fringes are imaged by an imaging lens 417. In some embodiments, the induced optical path difference (e.g., by the piezoelectric inertia actuator 413) can appear as a shift in the fringes across the detector plane. The detector 415 is in communication with a control and processing unit 419 to process the imaged fringes in order to generate a wavefront map for determining whether the UUT lens 409 passes the conformance test. In some embodiments, the control and processing unit 419 can be used to control one or both of the pre-conditioning optical module 403 and the piezoelectric inertia actuator 413. In some embodiments, the pre-conditioning optical module 403 includes an active optical component that can change the beam profile in response to an electrical or acoustic signal from the processing control module 419.

Figure 5:
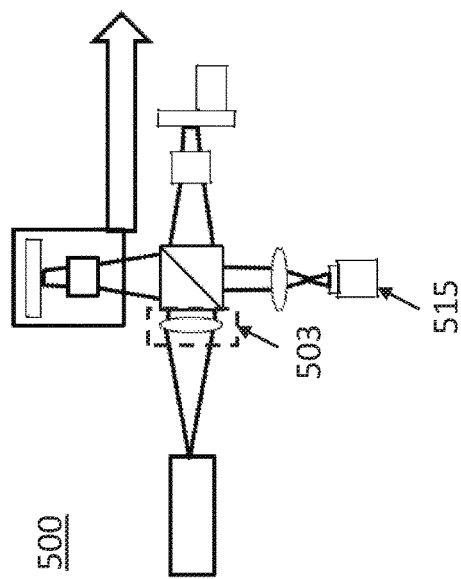
FIG. 5 illustrates examples of incoming beams and outgoing beams that go through the unit under test in an example Twyman-Green interferometer configuration in accordance with the present technology.
Figure 5:
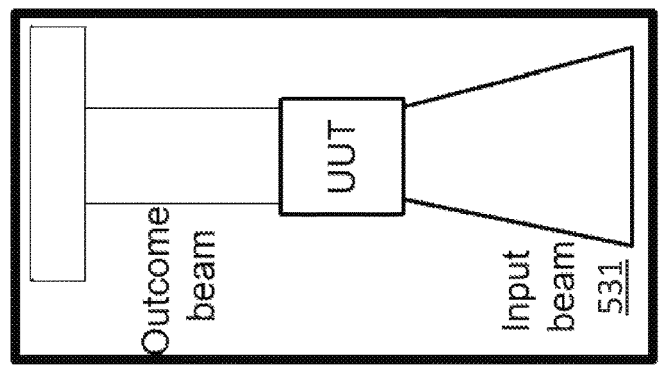
Figure 5:
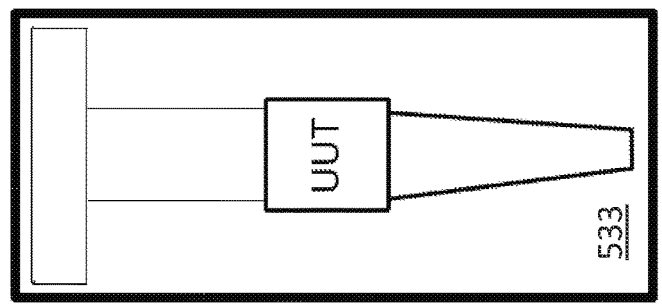
Figure 5:
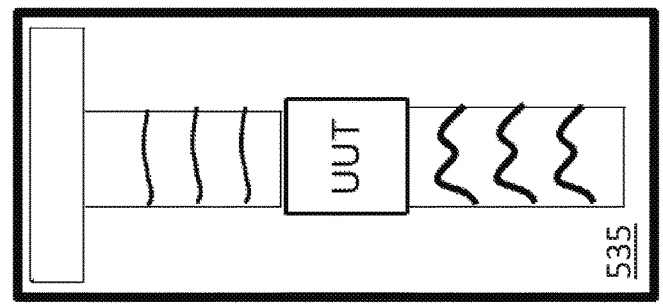

FIG. 5 illustrates example incoming beams and outgoing beams that go through the unit under test in an example Twyman-Green interferometer configuration in accordance with the present technology. The left side of FIG. 5 illustrates an example Twyman-Green interferometer configuration 500 similar to what is depicted in FIG. 4. The input beam received by the UUT can have a converging profile (531), a diverging profile (533), or a freeform wavefront (535). The use of the pre-conditioning optical module 503 allows the angle at which the output beam go through the UUT to be within a range as to form fringes at the detector 515.

Figure 6:
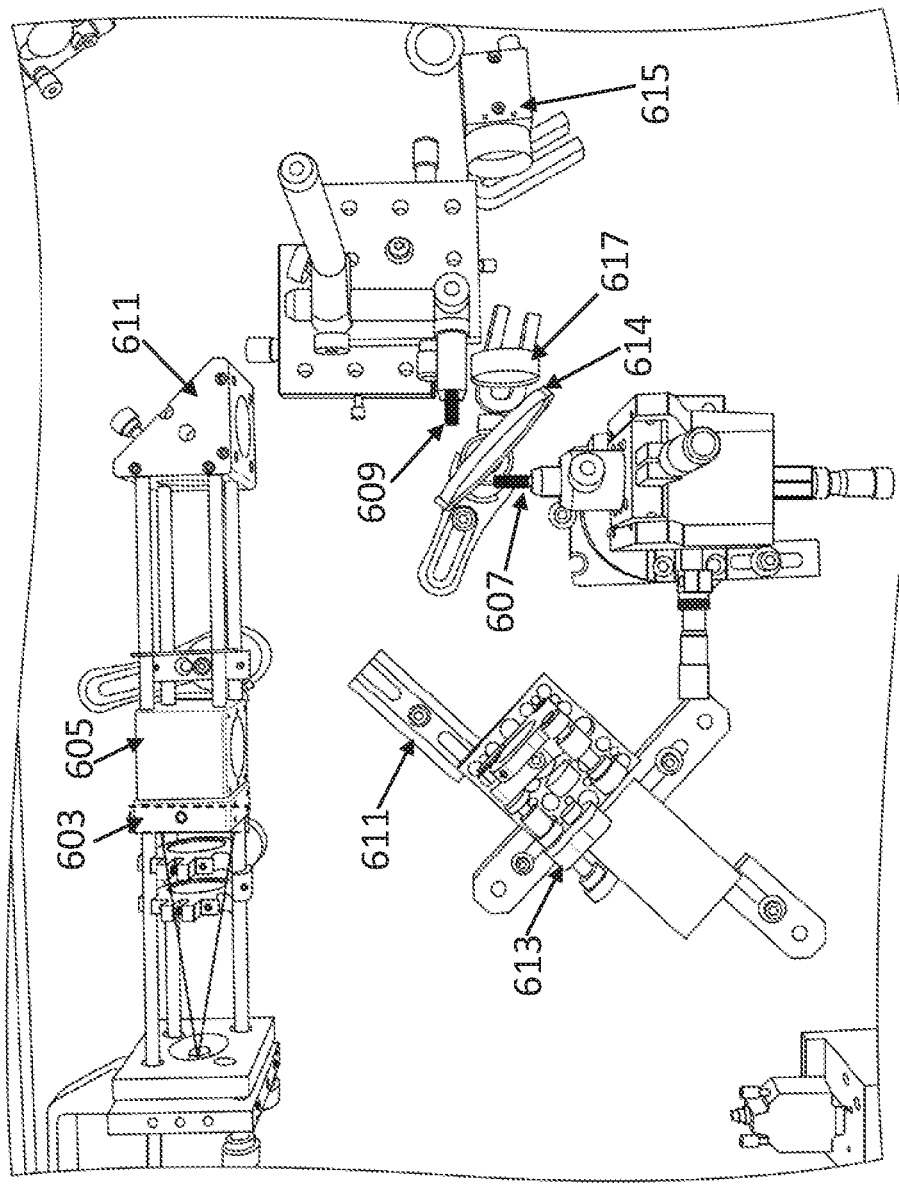
FIG. 6 illustrates an example lab setting that adopts a Mach-Zehnder interferometer configuration in accordance with the present technology.

The pre-conditioning optical module can also be similarly applied to other interferometer configurations such as the Michelson interferometer configuration or the Fizeau interferometer configuration. FIG. 6 illustrates an example lab setting 600 that adopts a Mach-Zehnder interferometer configuration in accordance with the present technology. The components in FIG. 6 are similarly situated as those in FIG. 1. The input light is received by the pre-conditioning optics section 603 and is provided to a beam splitter 605 after proper conditioning as described herein. The light from the beam splitter propagates in the test arm, and after reflection from the mirror 611 illuminates the test sample 609 and interferes with the reference beam that passes through the reference optics 607. The imaging lens 617 produces images at the camera 615 which captures images of the interference fringes that can be used to determine surface shape deviations and/or conformance of the test sample.

Among other differences when compared to conventional techniques, the pre-conditioning optical modules disclosed herein do not have to be perfect nulling optical modules: a pseudo-nulling effect produced by the pre-conditioning optical module is sufficient to ensure that fringes can be formed by the two beams from the test lens and the reference optics. Any imperfection of the nulling effect is applicable to both the test and the reference arms, known as common-path configuration, and does not impact the verification process of the target optics. Therefore, the pre-conditioning module allows for significant improvements in testing small, molded, freeform optical components because there is no need to produce a perfect nulling optical element for each test target. Moreover, this technology may be repurposed to test a large variety optics that have proven very difficult to test due to their extreme surface shapes.

Figure 7:
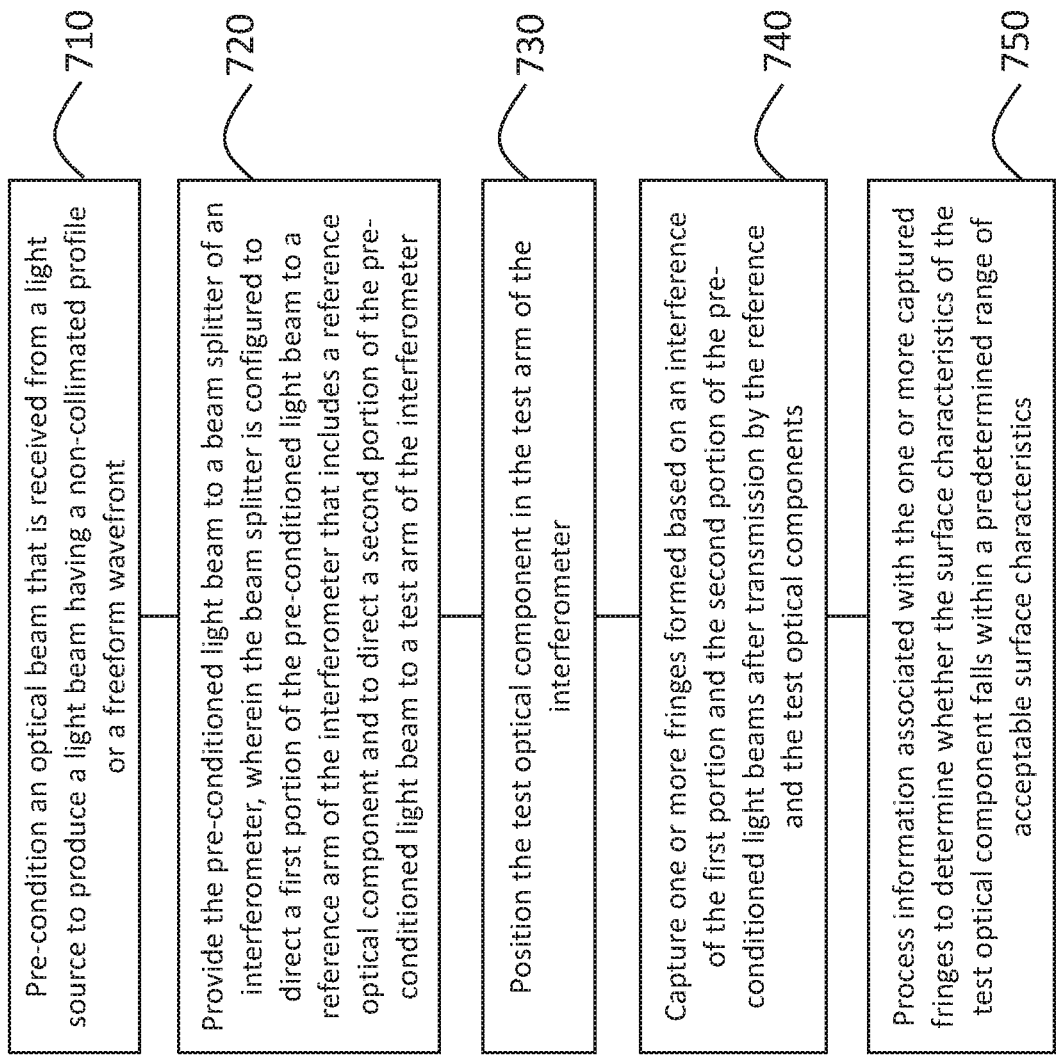
FIG. 7 illustrates a set of operations that can be carried out to measure a test optical component in accordance with an example embodiment.

FIG. 7 illustrates a set of operations that can be carried out to measure a test optical component in accordance with an example embodiment. At 710, an optical beam that is received from a light source is pre-conditioned to produce a light beam having a non-collimated profile or a freeform wavefront. At 720, the pre-conditioned light beam is provided to a beam splitter of an interferometer; the beam splitter is configured to direct a first portion of the pre-conditioned light beam to a reference arm of the interferometer that includes a reference optical component and to direct a second portion of the pre-conditioned light beam to a test arm of the interferometer. At 730, the test optical component is positioned in the test arm of the interferometer. At 740, one or more fringes that are formed based on an interference of the first portion and the second portion of the pre-conditioned light beams after transmission by the reference and the test optical components are captured. At 750, information associated with the one or more captured fringes are processed to determine whether the surface characteristics of the test optical component falls within a predetermined range of acceptable surface characteristics.

In one example embodiment, processing the information associated with the one or more captured fringes includes constructing a map indicative of a difference between a surface profile of the reference optical component and the test optical component, and determining, based on the map, whether the surface profile of the test optical component falls within a predetermined range of acceptable surface profile characteristics. In another example embodiment, pre-conditioning the optical beam includes changing a profile or a wavefront of the optical beam using one or more of a soft lens, a liquid lens, a spatial light modulator (SLM), a reflective object, one or more prisms, a zoom lens, an Alvarez lens, or a combination thereof.

According to another example embodiment, pre-conditioning of the optical beam includes generating a beam having one of a diverging profile, a converging profile, or a freeform wavefront. In one example embodiment, the method for measuring the test optical component includes operating a piezoelectric inertia actuator that is coupled to a mirror positioned along the reference arm or the test arm to change a corresponding optical path length, and reconstructing a phase map based on the changed optical path length. In yet another example embodiment, the interferometer is one of: a Mach-Zehnder interferometer, a Twyman-Green interferometer, a Michelson interferometer, or a Fizeau interferometer.

One aspect of the disclosed embodiments relates to an apparatus for measuring a test optical component that includes a pre-conditioning optical module positioned to receive an optical beam from a light source and to produce a beam having a non-collimated beam profile or a freeform wavefront, and a beam splitter positioned to receive the beam output from the pre-conditioning optical module and to direct a first portion of the beam to a reference arm configured to accommodate a reference optical component, and to direct a second portion of the beam to a test arm configured to accommodate the test optical component. The apparatus further includes a beam combiner positioned to receive the beams from the reference arm and the test arm after reflection or refraction by the reference and the test optical components. The pre-conditioning optical module of the apparatus is configured to introduce a change in a profile or a wavefront of the beam that is output from the pre-conditioning optical module such that the beams that are output from the beam combiner form a resolvable fringe pattern at a detector image plane.

In one example embodiment, the apparatus includes a detector positioned at the image plane to capture the fringe pattern and to produce electrical signals based on the detected fringe pattern. In another example embodiment, the apparatus includes a control and processing unit that includes one or more processors and memory having instructions stored thereon, where the instructions upon execution by the one or more processors cause the one or more processors to receive the electrical signals from the detector and to process the electrical signals to produce information that characterizes a property of the test optical component. In one example embodiment, the information includes surface characteristics of the test optical component.

In another example embodiment, the pre-conditioning optical module includes an active optical component that is configured to effect the change in the profile or the wavefront in response to an electrical or an acoustic signal. In some example embodiments, the pre-conditioning optical module includes a soft lens, a liquid lens, a spatial light modulator (SLM), a reflective object, a prism, a zoom lens, or an Alvarez lens. In yet another example embodiment, the pre-conditioning optical module includes one or more of: a neutral density filter, a color filter, or a polarization filter. In still another example embodiment, the pre-conditioning optical module is configured to produce a bream having a diverging profile, a converging profile, or a freeform wavefront.

According to another example embodiment, the beam splitter and the beam combiner form a single unit that operates as a beam splitter and as a beam combiner. In another example embodiment, one or both of the beam splitter and the beam combiner is a pellicle or a cube beam splitter. In one example embodiment, the apparatus includes two mirrors, wherein a first mirror is positioned in the reference arm and the second mirror is positioned in the test arm, and the apparatus also includes a piezoelectric actuator coupled to at least one of the mirrors, where the piezoelectric actuator configured to change an optical path length by displacing the corresponding mirror.

In yet another example embodiment, the beam splitter and the beam combiner are components of one of the following interferometer configurations: a Mach-Zehnder interferometer, a Twyman-Green interferometer, a Michelson interferometer, or a Fizeau interferometer. In one example embodiment, the reference and test optical components are freeform optical components, each having surface characteristics that cause an optical beam having a collimated profile to reflect or refract at angles that prevent formation of the fringe pattern at the image plane without the preconditioning optical module. In still another example embodiment, the apparatus including the light source that includes a laser. In another example embodiment, the reference optical component is a freeform lens having known surface characteristics, and the test optical component is another freeform lens that is to be tested to determine whether surface characteristics thereof fall within a predetermined range of deviations from the known surface characteristics. Any of the above embodiments can be combined.

At least parts of the disclosed embodiments that include modules and the functional operations can be implemented in digital electronic circuitry, or in computer software, firmware, or hardware. For example, electronic circuits can be used to control the operation of the detector and/or to reconstruct the wavefront maps. At least some of those embodiments or operations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for measuring a test optical component, comprising:
   a pre-conditioning optical module positioned to receive an optical beam from a light source and to produce a beam having a non-collimated beam profile or a freeform wavefront;
   a beam splitter positioned to receive the beam output from the pre-conditioning optical module and to direct a first portion of the beam to a reference arm configured to accommodate a reference optical component, and to direct a second portion of the beam to a test arm configured to accommodate the test optical component; and
   a beam combiner positioned to receive the beams from the reference arm and the test arm after reflection or refraction by the reference and the test optical components,
   wherein the pre-conditioning optical module is configured to produce a beam having a diverging profile, a converging profile, or a freeform wavefront that is incident on the test optical component and the reference optical component, and wherein the pre-conditioning optical module is configured to introduce a change in a profile or a wavefront of the beam that is output from the pre-conditioning optical module such that the beams that are output from the beam combiner form a resolvable fringe pattern at a detector image plane.

2. The apparatus of claim 1, comprising a detector positioned at the image plane to capture the fringe pattern and to produce electrical signals based on the detected fringe pattern.

3. The apparatus of claim 2, comprising a control and processing unit that includes one or more processors and memory having instructions stored thereon, the instructions upon execution by the one or more processors cause the one or more processors to receive the electrical signals from the detector and to process the electrical signals to produce information that characterizes a property of the test optical component.

4. The apparatus of claim 3, wherein the information includes surface characteristics of the test optical component.

5. The apparatus of claim 1, wherein the pre-conditioning optical module includes an active optical component that is configured to effect a change in the profile or the wavefront in response to an electrical or an acoustic signal.

6. The apparatus of claim 1, wherein the pre-conditioning optical module includes a soft lens, a liquid lens, a spatial light modulator (SLM), a reflective object, a prism, a zoom lens, or an Alvarez lens.

7. The apparatus of claim 6, wherein the pre-conditioning optical module includes one or more of: a neutral density filter, a color filter, or a polarization filter.

8. The apparatus of claim 1, wherein the beam splitter and the beam combiner form a single unit that is operable as a beam splitter and as a beam combiner.

9. The apparatus of claim 1, wherein one or both of the beam splitter and the beam combiner is a pellicle or a cube beam splitter.

10. The apparatus of claim 9, further comprising:
    a first and a second mirror, wherein the first mirror is positioned in the reference arm and the second mirror is positioned in the test arm; and
    a piezoelectric actuator coupled to at least one of the mirrors, the piezoelectric actuator configured to change an optical path length by displacing the corresponding mirror.

11. The apparatus of claim 1, wherein the beam splitter and the beam combiner are components of one of the following interferometer configurations: a Mach-Zehnder interferometer, a Twyman-Green interferometer, a Michelson interferometer, or a Fizeau interferometer.

12. The apparatus of claim 1, wherein the reference and test optical components are freeform optical components, each having surface characteristics that cause an optical beam having a collimated profile to reflect or refract at angles that prevent formation of the fringe pattern at the image plane without the pre-conditioning optical module.

13. The apparatus of claim 1, comprising the light source that includes a laser.

14. The apparatus of claim 1, wherein the reference optical component is a freeform lens having known surface characteristics, and the test optical component is another freeform lens that is to be tested to determine whether surface characteristics thereof fall within a predetermined range of deviations from the known surface characteristics.

15. A method for measuring a test optical component, comprising:

pre-conditioning an optical beam that is received from a light source to produce a light beam having a non-collimated profile or a freeform wavefront;

providing the pre-conditioned light beam to a beam splitter of an interferometer, wherein the beam splitter is configured to direct a first portion of the pre-conditioned light beam to a reference arm of the interferometer that includes a reference optical component and to direct a second portion of the pre-conditioned light beam to a test arm of the interferometer, wherein the beam splitter directs the first and the second portions of the pre-conditioned light beam having a diverging profile, a converging profile, or a freeform wavefront to the test optical component and the reference optical component;

positioning the test optical component in the test arm of the interferometer;

capturing one or more fringes formed based on an interference of the first portion and the second portion of the pre-conditioned light beams after transmission by the reference and the test optical components; and processing information associated with the one or more captured fringes to determine whether surface characteristics of the test optical component fall within a predetermined range of acceptable surface characteristics.

16. The method of claim 15, wherein processing the information associated with the one or more captured fringes includes constructing a map indicative of a difference between a surface profile of the reference optical component and a surface profile of the test optical component; and determining, based on the map, whether the surface profile of the test optical component falls within a predetermined range of acceptable surface profile characteristics.

17. The method of claim 16, comprising:

operating a piezoelectric inertia actuator that is coupled to a mirror positioned along the reference arm or the test arm to change a corresponding optical path length; and reconstructing a phase map based on the changed optical path length.

18. The method of claim 15, wherein the pre-conditioning the optical beam includes changing a profile or a wavefront of the optical beam using one or more of a soft lens, a liquid lens, a spatial light modulator (SLM), a reflective object, one or more prisms, a zoom lens, an Alvarez lens, or a combination thereof.

19. The method of claim 15, wherein the pre-conditioning of the optical beam includes generating a beam having one of the diverging profile, the converging profile, or the freeform wavefront.

20. The method of claim 15, wherein the interferometer is one of: a Mach-Zehnder interferometer, a Twyman-Green interferometer, a Michelson interferometer, or a Fizeau interferometer.

21. The method of claim 15, wherein pre-conditioning the optical beam comprises adjusting a profile of the optical beam based on the test or the reference optical components using a pre-conditioning optical module to enable formation of the one or more fringes.

* * * * *